6684X
I. FOBES.
STAVE JOINTER.
Patented Aug. 3, 1831.
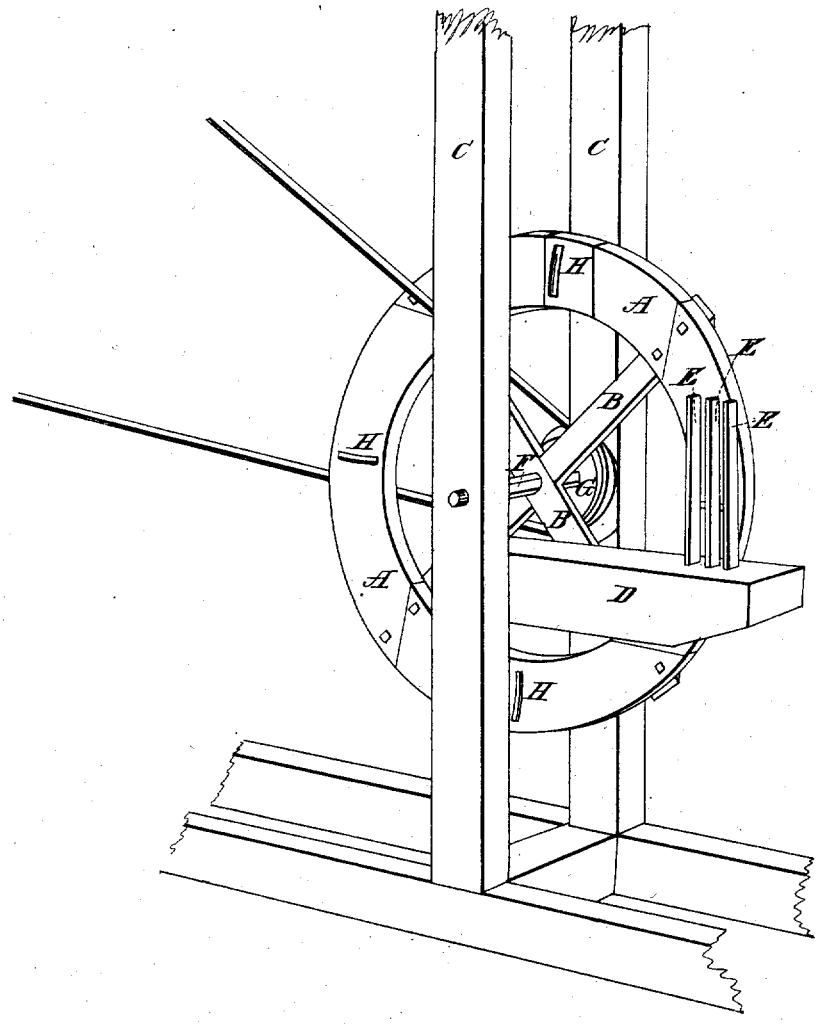
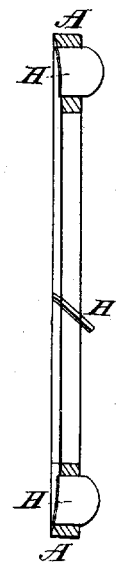

Aug. 3. 1831 6684X

Isaac Forbes, Bridgewater Massachusetts

Letters Patent.

The Schedule, referred to in these Letters Patent, & making part of the same, containing a description in the words of the said Isaac Forbes himself of his improvement called the Stave Jointer.

To all to whom these presents shall come.

Be it known that I Isaac Forbes, of Bridgewater, in the County of Ply=mouth and State of Massachusetts, have invented, caused to be made, and applied to use, a new and useful improvement in the art of Coop=ering or of making Barrels or Casks; which consists in Jointing the staves by a Machine which I call the concave Stave Jointer, and that the following is a full and exact description of the construction and operation of the said Machine as invented by me. This Jointer I construct in the form of a wheel or section of a hollow sphere to turn on an axis which passes through the centre thereof. The jointer face or cutting side thereof should be turned out in a concave form like or similar to the inner surface of a common Watch Chrystal, or (to form the staves straighter near the ends so that less strain shall come on the chime hoop of the cask) the face of the Jointer should be somewhat flatter or less concave toward the periphery approaching the form of a trumpet mouth. Said wheel or Jointer is perforated near its periphery and at proper dis=tances to receive four or more Jointer irons or cutters which are held in their places by wedges or screws, and the edges thereof are ground and adjusted to correspond to the concavity of the face of the Jointer so that when the jointer is caused to revolve briskly on its axis by the application of power thereto (by means of a crank, pulley and belt or gear) and the edge of a stave is properly held against the face thereof in the direction of a chord line to the circle of the jointer the cutting edges so projecting therefrom will each in succession cut shavings from the stave and thus immediately reduce its whole length to the required form

6689X bevel and curve at the same operation; after which the Stav
is to be shifted so as to bring the other edge thereof in like manne
in contact with the Jointer face where a like operation complete
the Jointing of the Stave. The dimensions and concave form of
the jointer may vary according to the sizes and proportions of th
casks for which the staves to be jointed therewith are intende
A convenient one for Jointing Barrel Staves should be about seve
feet in diameter with a rim a foot deep and three or four inches thic
and bolted to the ends of two pieces of scantling locked together in th
middle in the form of a cross and thus constituting the four arms
of the wheel or jointer. an iron shaft is firmly fixed in the centre
of the wheel and constitutes the axis thereof. The rim is perforated to receiv
four or more Jointer irons or cutters of such width or so arrange
that nine inches of the depth of the rim or Jointer face may at lea
twice in the course of a revolution present a cutting edge to a Stave
which may be held against any portion of the said depth. The degr
of concavity should be about one inch and a half in the depth of ri
here spoken of. Two upright posts (properly secured at top and bott
to the building in which the Jointer operates, or to any other fixtures)
form supports in which the jointer axis turns; and in the front
post at half the length of the stave below the axis is framed a timber
which extends along close by the face of the jointer in nearly a horizont
direction to the length of the semi-diameter of the jointer and forms a
rest on which the end of the stave stands during the process of join
-ing, in this rest and close to the jointer face are inserted in a per
pendicular direction two or more guide pieces between which the sta
is placed and which serve to aid the workman in holding it in the right
position while Jointing. The reason why I have recommended so great a
depth of jointer face and extent of cutting edge is that there are gen
-erally different widths of staves in the same cask and in orde
to give each its proper form the narrow staves should be held nea
the periphery during the process of Jointing, and so the wider on
more toward the axis. The proper position however to form
the

6684X the stave to the curve and bevel desired is speedily attained
by the workman and as each will proportion his casks to
suit his own fancy. a further description seems not to be so
needful. I would observe however that the concave
surface of the jointer may be made sufficiently deep or extensive
and have a corresponding number of cutters inserted therein
to joint staves for any sized casks with the same jointer if
it be desired; and may revolve either in a vertical, horizon-
tal, or oblique position.

What I claim as my own original invention is the principle
by which the requisite curve is given to the whole length of the
stave at one operation by cutters adjusted to a concave or un
concavie wheel and secured thereto while the said wheel
receives a rotary motion during the proceſs of jointing the sa
stave- which principle I apply in the concave jointer con=
structed and used agreeably to the foregoing specification

In testimony of all which I hereunto set my hand
and seal this eleventh day of July in the year of our Lord
one thousand eight hundred and thirty one, at Bridgewater
aforesaid.

Witneſses
Daniel Mitchell
Bela Mitchell

Isaac [illegible]

Exd
W.J.C.

[illegible]

(Patented 3 August 1831)

[illegible]